(12) United States Patent
Iwai

(10) Patent No.: US 7,287,886 B2
(45) Date of Patent: Oct. 30, 2007

(54) INTERIOR ILLUMINATOR FOR AUTOMOBILE

(75) Inventor: Shiro Iwai, Niiza (JP)

(73) Assignee: Honda Access Corp., Saitama (JP)

( * ) Notice: Subject to any disclaimer, the term of this patent is extended or adjusted under 35 U.S.C. 154(b) by 86 days.

(21) Appl. No.: 11/093,037

(22) Filed: Mar. 30, 2005

(65) Prior Publication Data

US 2005/0219855 A1 Oct. 6, 2005

(30) Foreign Application Priority Data

Mar. 31, 2004 (JP) ............. 2004-106845

(51) Int. Cl.
*B60Q 3/02* (2006.01)
(52) U.S. Cl. .................. 362/490; 362/488; 362/551
(58) Field of Classification Search ........... 362/490, 362/223, 364, 479, 488, 551, 576
See application file for complete search history.

(56) References Cited

U.S. PATENT DOCUMENTS

| 2,718,586 A * | 9/1955 | Dickson ............... 362/490 |
| 6,402,354 B1 * | 6/2002 | Tatewaki et al. ....... 362/490 |
| 6,929,389 B1 * | 8/2005 | Rhee .................... 362/490 |
| 2003/0227778 A1 * | 12/2003 | Tanabe ................. 362/487 |
| 2004/0183956 A1 * | 9/2004 | Kim et al. ............. 349/58 |
| 2004/0257807 A1 * | 12/2004 | Endo et al. ............ 362/247 |

FOREIGN PATENT DOCUMENTS

| EP | 1 380 469 A2 | | 1/2004 |
| FR | 2444590 A | * | 8/1980 |
| JP | 57-172838 | | 10/1982 |
| JP | 59011934 A | * | 1/1984 |
| JP | 10-129345 | | 5/1998 |
| JP | 10157517 A | * | 6/1998 |
| JP | 2003-95016 | | 4/2003 |

* cited by examiner

*Primary Examiner*—Renee Luebke
*Assistant Examiner*—Mary Zettl
(74) *Attorney, Agent, or Firm*—Westerman, Hattori, Daniels & Adrian, LLP.

(57) ABSTRACT

To provide an interior illuminator for an automobile that prevents light leakage to the driver's seat and light reflection in a window glass, can illuminate a backseat more evenly with an adequate quantity of light, consumes less electric power, generates less heat, has a small size and can be produced at a reduced cost.

An interior illuminator has: cold cathode tubes 5, 6; a cold cathode tube driving circuit for driving the cold cathode tubes 5, 6; manipulation switches 12, 13, 14 and 15 for turning on and off the cold cathode tubes; and a housing 2 that houses the cold cathode tube driving circuit and holds the cold cathode tubes and the manipulation switches. The housing 2 is attached in a position on a longitudinal center line of the automobile and behind the driver's seat, and the cold cathode tubes 5, 6 each have an illumination range set to be lower than the lower edge of a window glass behind the driver's seat.

11 Claims, 15 Drawing Sheets

INTERIOR ILLUMINATOR FOR AUTOMOBILE

BACKGROUND OF THE INVENTION

1. Field of the Invention

The present invention relates to an interior illuminator for an automobile which is provided on the ceiling of the automobile and illuminates the interior of the automobile.

2. Description of the Related Art

A conventional known illuminator for illuminating the interior of an automobile uses a light bulb as a light source. The illuminator of this type is attached to the ceiling of the automobile and illuminates the interior when a switch is manipulated by an occupant or when a door switch is turned on by the opening of a door. However, in the case of using a light bulb as the light source, the light bulb has to be a large one to achieve an adequate light quantity, and therefore, the light bulb disadvantageously protrudes significantly into the interior of the automobile. To avoid this, a plurality of small light bulbs may be used to achieve the same light quantity as the large one. In this case, however, there is a problem that the heat generation, as well as the power consumption, increases, and the illumination light becomes uneven in the illumination range.

Another known illuminator uses a fluorescent lamp as a light source (see Japanese Patent Laid-Open No. 10-129345, for example). The fluorescent lamp consumes less electric power and illuminates more evenly than the light bulb. However, as with the light bulb, there is a problem that the fluorescent lamp has to be large to achieve an adequate quantity of light, although the fluorescent lamp is elongated compared with the light bulb. In addition, the fluorescent lamp requires a relatively large driving circuit to turn the lamp on and, thus, is difficult to downsize, so that there is a problem that the fluorescent lamp protrudes significantly from the ceiling of the automobile. Furthermore, the fluorescent lamp has no directivity of illumination, the light may leak to the driver's seat or be reflected in a window glass. Furthermore, the fluorescent lamp requires a long time to turn on after energization and requires a further time to reach a normal quantity of light after turning on. Therefore, the fluorescent lamp cannot turn on immediately after a door is opened, and a light bulb has to be additionally used to realize illumination associated with opening of the doors, resulting in problems of the increased number of parts and assembling steps, and thus the increased cost, as well as the increased size.

To solve the problems described above, an object of the present invention is to provide an interior illuminator for an automobile that prevents light leakage to the driver's seat and light reflection in a window glass, can illuminate a backseat more evenly with an adequate quantity of light, consumes less electric power, generates less heat, has a small size and can be produced at a reduced cost.

SUMMARY OF THE INVENTION

In order to attain the object, the present invention provides an interior illuminator for an automobile that is attached to a ceiling of the automobile, comprising: a cold cathode tube having a predetermined length; a cold cathode tube driving circuit for driving the cold cathode tube; a manipulation switch for turning on and off the cold cathode tube; and a housing that houses the cold cathode tube driving circuit and holds the cold cathode tube and the manipulation switch, in which the housing is attached in a position on a longitudinal center line of the automobile and behind the driver's seat, and the cold cathode tube has an illumination range set to be lower than the lower edge of a window glass located behind the driver's seat.

According to the present invention, since the cold cathode tube is used as a light source, and the housing holding the cold cathode tube is attached to the ceiling in a position on the longitudinal center line of the automobile behind the driver's seat, the back seat can be illuminated adequately with a sufficient quantity of light. In addition, since the relatively high directivity of the cold cathode tube is used, and the illumination range is set lower than the lower edge of a window glass behind the driver's seat, the light leakage to the driver's seat and the light reflection in a window glass at the backseat can be highly reduced, and thus, an occupant can get a good view of the outside from the window.

In addition to the less power consumption and less heat generation, the cold cathode tube can be made small while maintaining an adequate quantity of light. Therefore, by using the cold cathode tube as a light source, the illuminator can be made extremely small (in thickness, in particular).

Furthermore, according to the present invention, it is preferred that the housing holds a pair of cold cathode tubes arranged in parallel and is attached to the ceiling of the automobile in such a manner that the cold cathode tubes are placed on the opposite sides of the longitudinal center line of the automobile. In this case, the light leakage to the driver's seat and the light reflection in a window glass can be prevented, and the backseat can be illuminated evenly because the paired cold cathode tubes illuminate the backseat by compensating for the dark area of each cold cathode tube with the bright area of the other.

Furthermore, it is preferred that the paired cold cathode tubes are provided with primary optical axes thereof being inclined at a predetermined angle oppositely in the lateral direction of the automobile. In this case, the illumination range can be set lower than the lower edge of a window glass behind the driver's seat, and a reflector plate or a screen does not have to be used with the illuminator. Thus, the number of parts is reduced, and the manufacturing cost can be reduced. The inclination angles of the primary optical axes of the cold cathode tubes with respect to the vertical downward direction are preferably each selected from a range from 10 to 20°. That is, if the inclination angle of the primary optical axis of each cold cathode tube with respect to the vertical downward direction is smaller than 10°, the quantity of light may be insufficient in areas near the doors. On the other hand, if the inclination angle is larger than 20°, the quantity of light may be insufficient in the middle area of the automobile, and more light may be applied to or reflected in a window glass. Thus, by setting the inclination angle of each cold cathode tube at an angle ranging from 10 to 20°, the light reflection in a window glass can be prevented while maintaining good illumination of the seats.

Furthermore, according to the present invention, the cold cathode tube is supported on a circuit board via a pair of terminal holding sections that cover electrode terminals of the cold cathode tube provided at the longitudinal ends thereof, the circuit board comprising the cold cathode tube driving circuit, and the terminal holding sections are made of an elastic soft material. In this case, a vibration occurring when the automobile runs can be absorbed and reduced by the terminal holding sections.

Furthermore, according to the present invention, it is preferred that a surface of the circuit board on which the cold cathode tube is mounted has a highly bright color. In this case, the light diffused from the cold cathode tube can be efficiently used as illumination light without absorbed by the circuit board.

Furthermore, according to the present invention, it is preferred that the housing has a diffuse-transmission member that at least covers the cold cathode tube and transmits and diffuses the light from the cold cathode tube. The diffuse-transmission member is a member for expanding the outline of the light source of the cold cathode tube itself without broadening the relatively high directivity of light emitted by the cold cathode tube. Therefore, the diffuse-transmission member prevents the cold cathode tube from being viewed directly and the light from being excessively bright.

In general, the ceiling of the automobile has a curve in profile so that the ceiling becomes higher from the periphery towards the center when observed from inside the vehicle. According to the present invention, the cold cathode tube that can be made small while maintaining a sufficient quantity of light is used as a light source, so that the illuminator has a reduced thickness, and therefore, the cold cathode tube can be located above a plane connecting upper edges of window glasses and accommodated in the curve of the ceiling. Thus, the illuminator illuminating the backseat can be prevented from being viewed by an occupant of another automobile, and the illuminator can be used without compromising the appearance of the automobile.

DETAILED DESCRIPTION OF THE PREFERRED EMBODIMENTS

Figure 1:
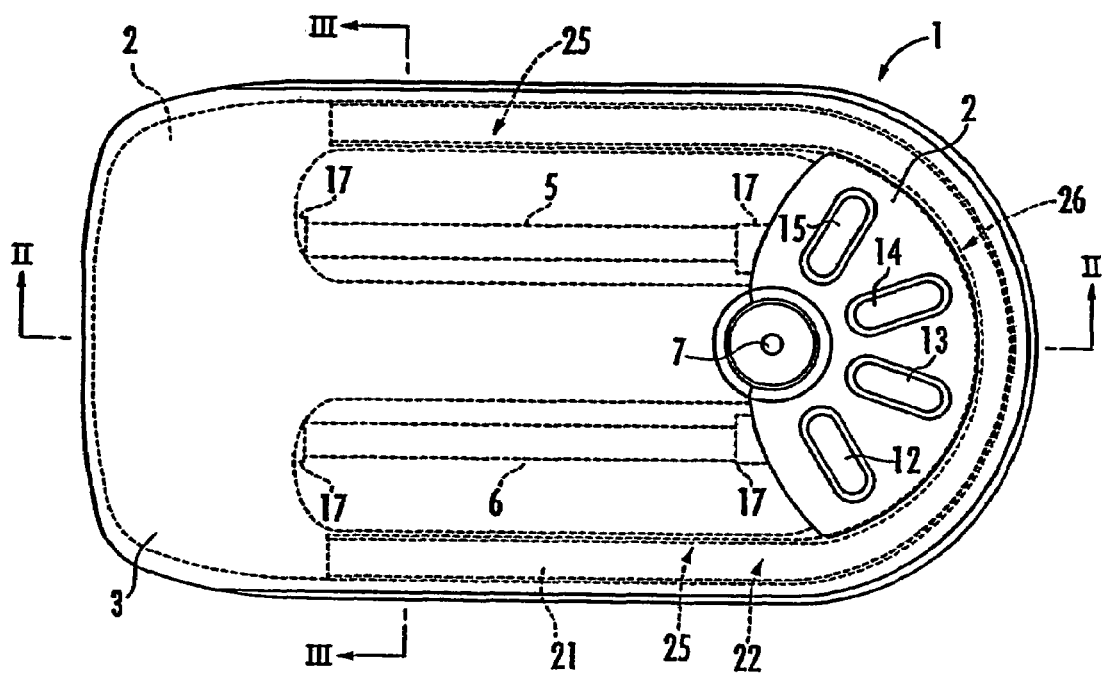
FIG. 1 is a plan view of an illuminator according to an embodiment of the present invention.
Figure 2:
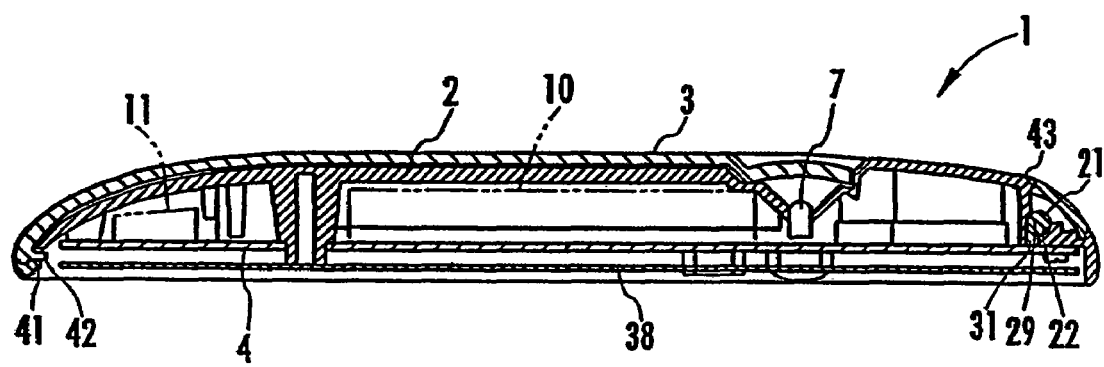
FIG. 2 is a cross sectional view of the illuminator taken along the line II-II in FIG. 1.
Figure 3:
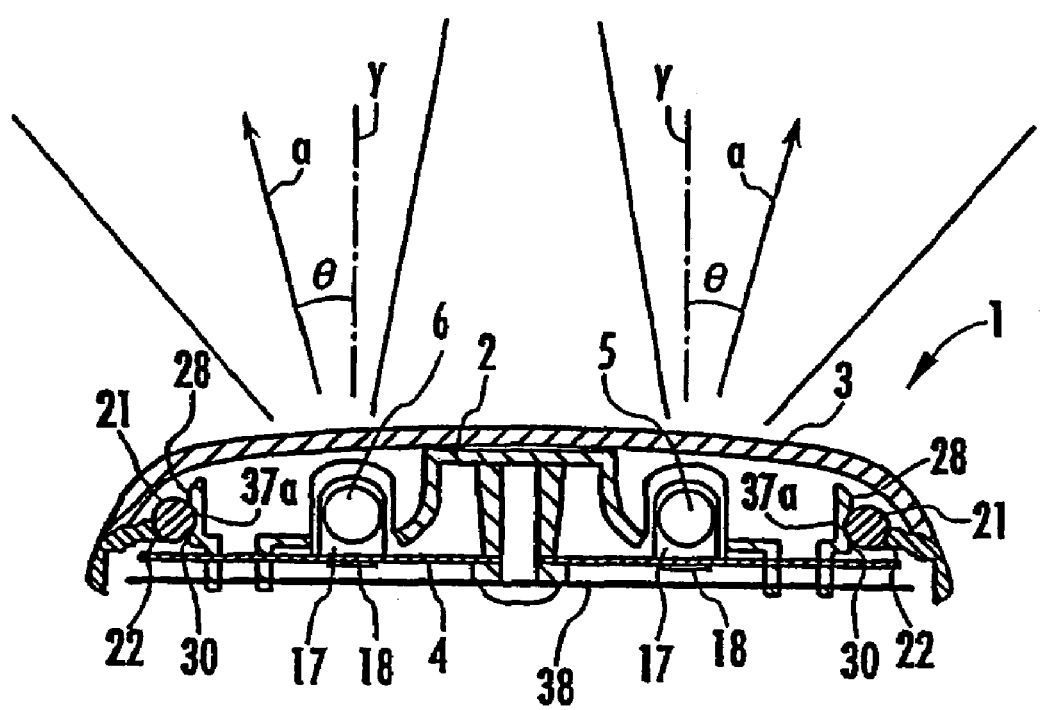
FIG. 3 is a cross sectional view of the illuminator taken along the line III-III in FIG. 1.
Figure 4:
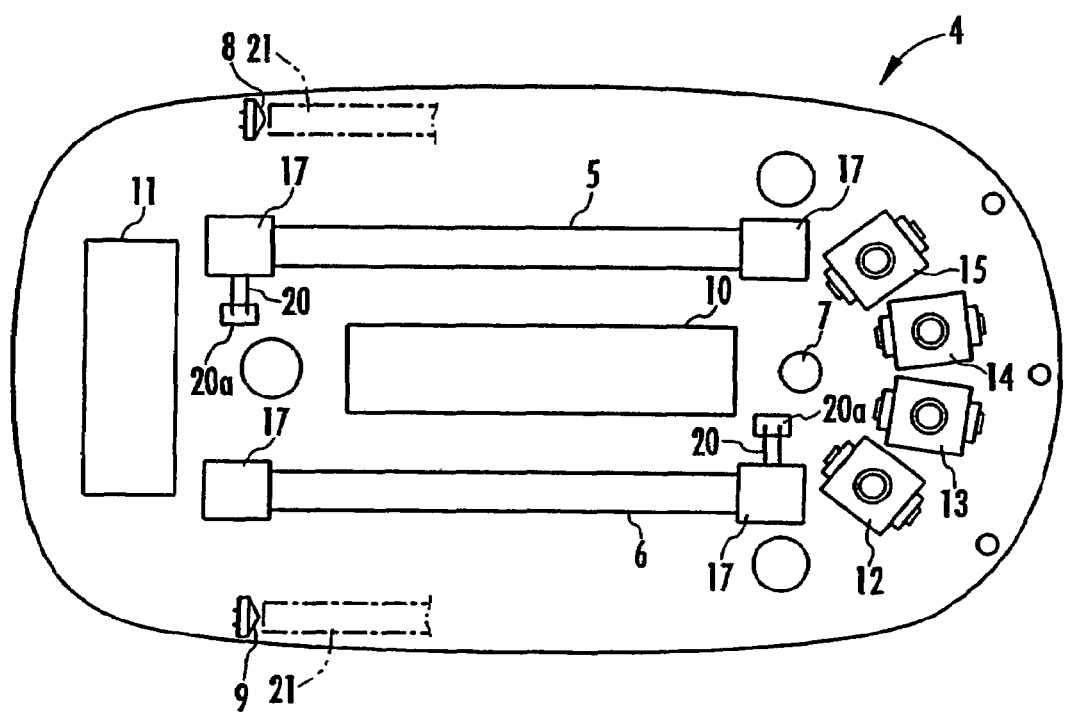
FIG. 4 is a plan view of a circuit board.
Figure 5:
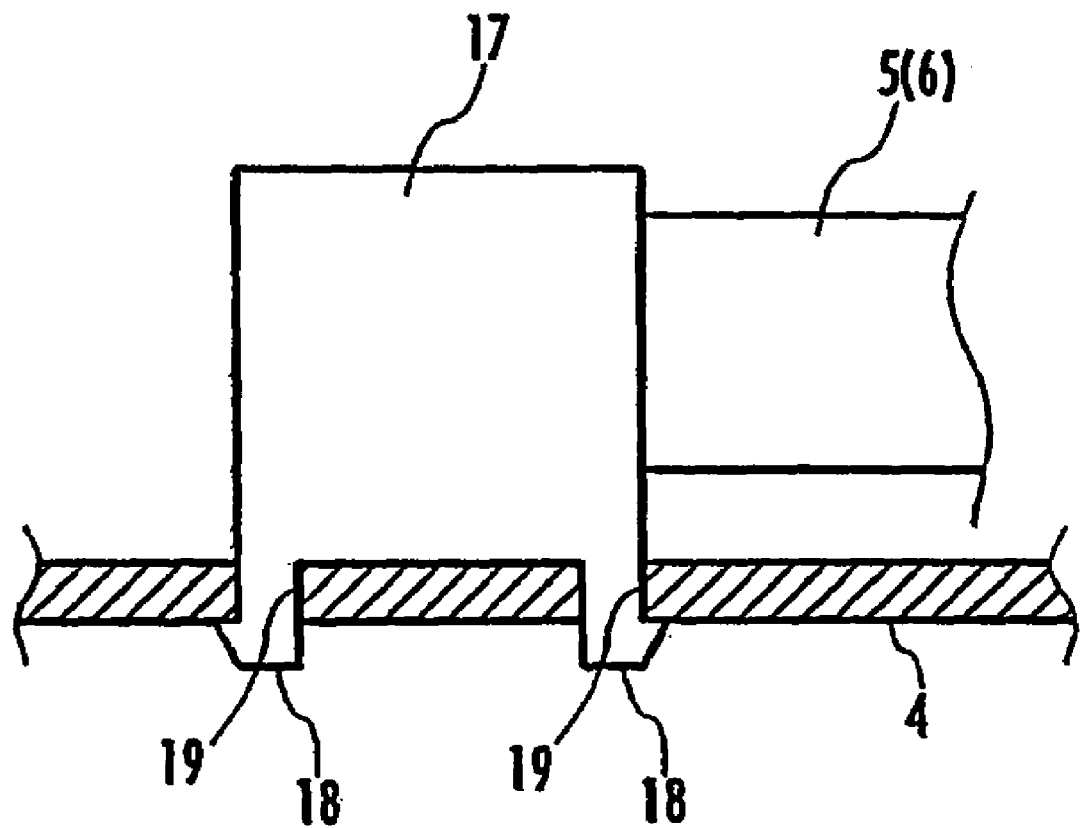
FIG. 5 is a cross sectional view of a part of the circuit board.
Figure 6:
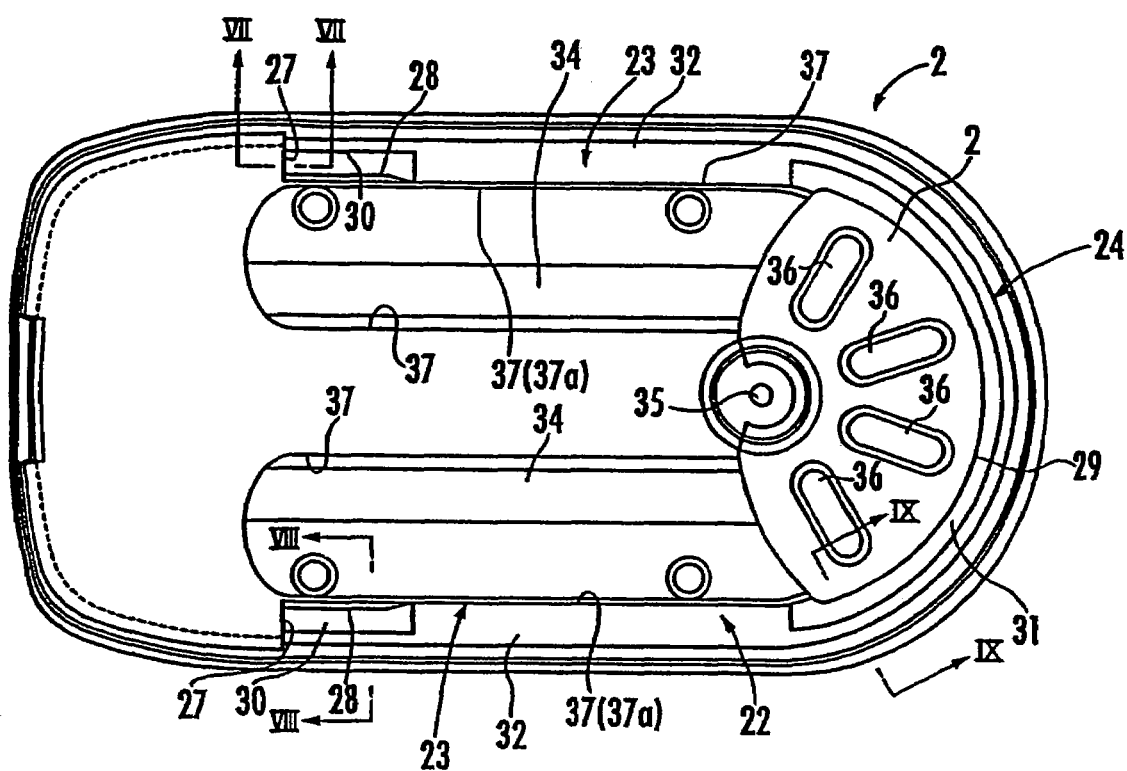
FIG. 6 is a plan view of a housing.
Figure 7:
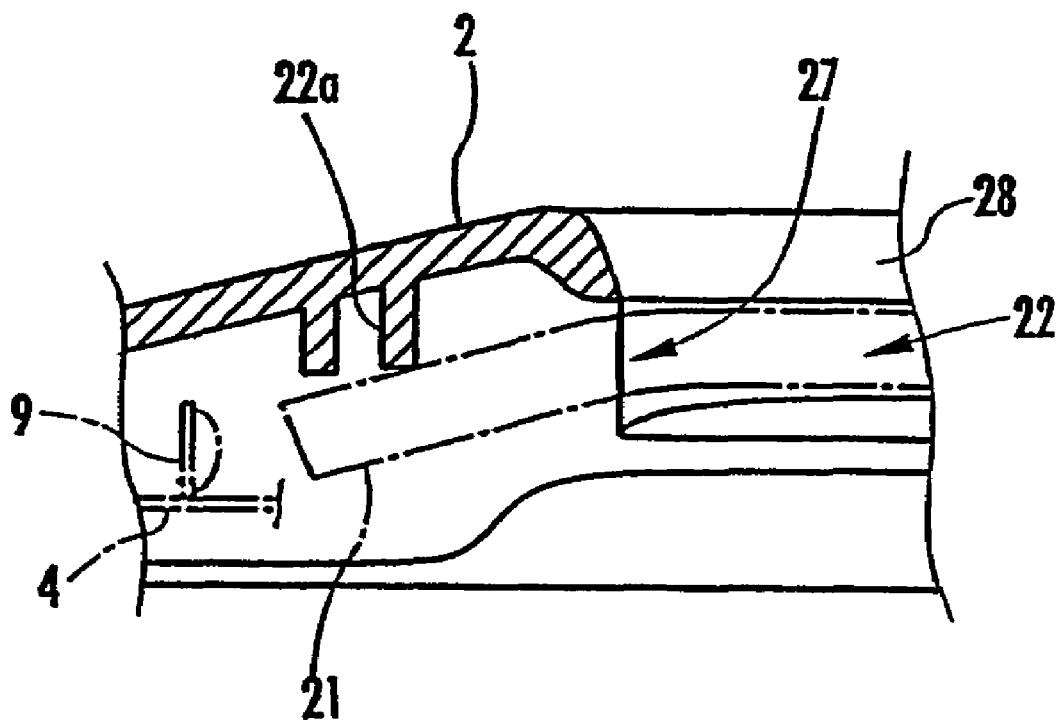
FIG. 7 is a cross sectional view of the housing taken along the line VII-VII in FIG. 6.
Figure 8:
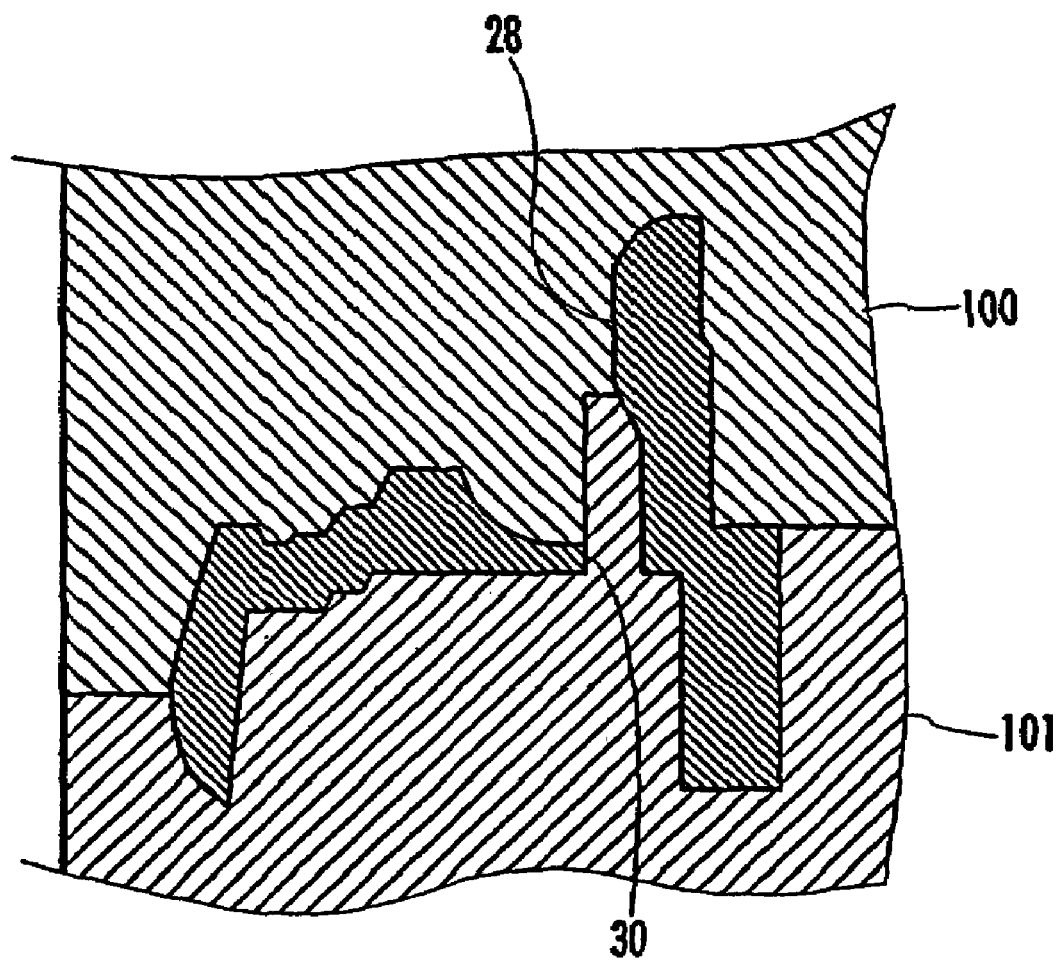
FIG. 8 is a cross sectional view of the housing being formed taken along the line VIII-VIII in FIG. 6.
Figure 9:
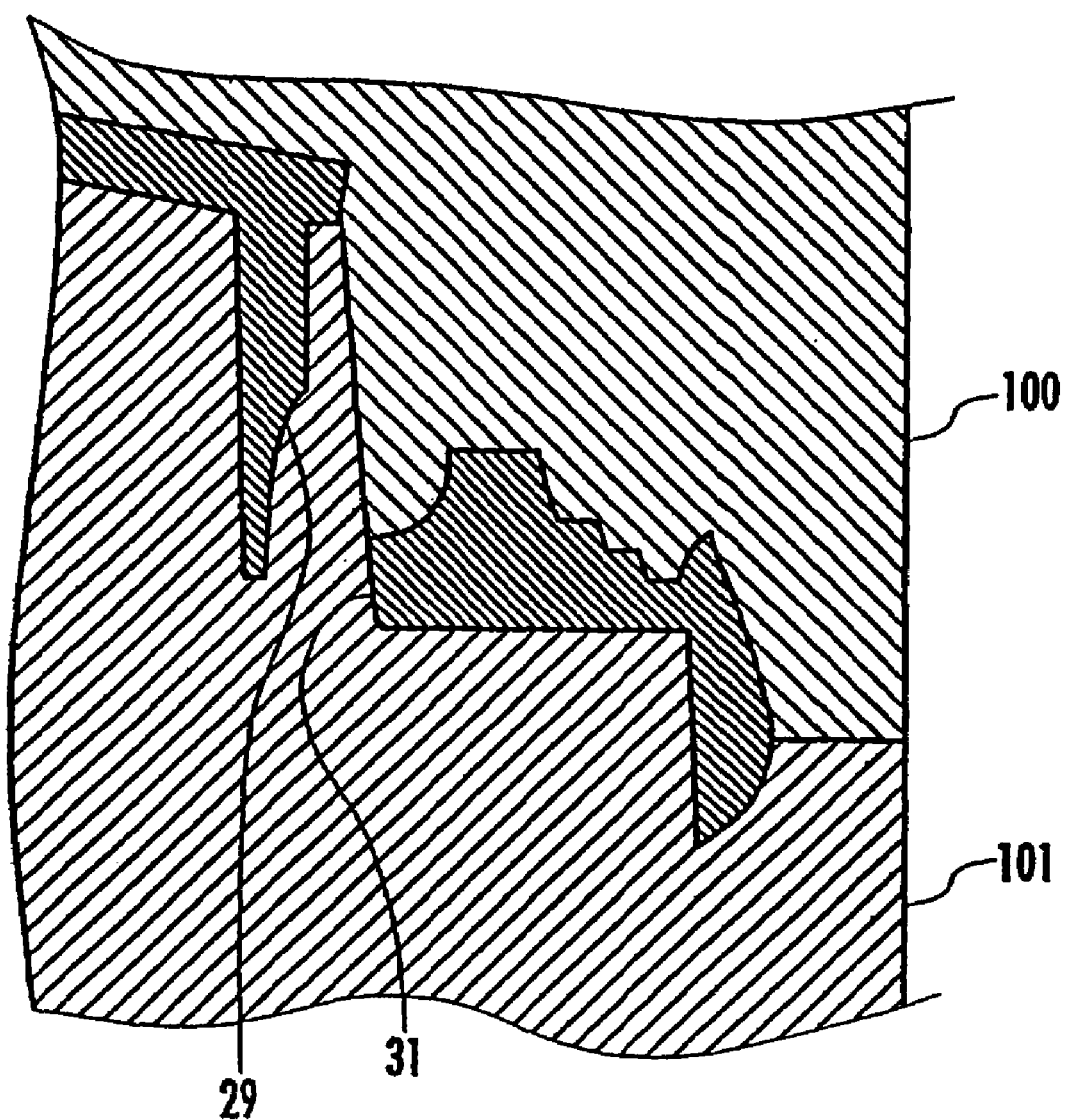
FIG. 9 is a cross sectional view of the housing being formed taken along the line IX-IX in FIG. 6.
Figure 10:
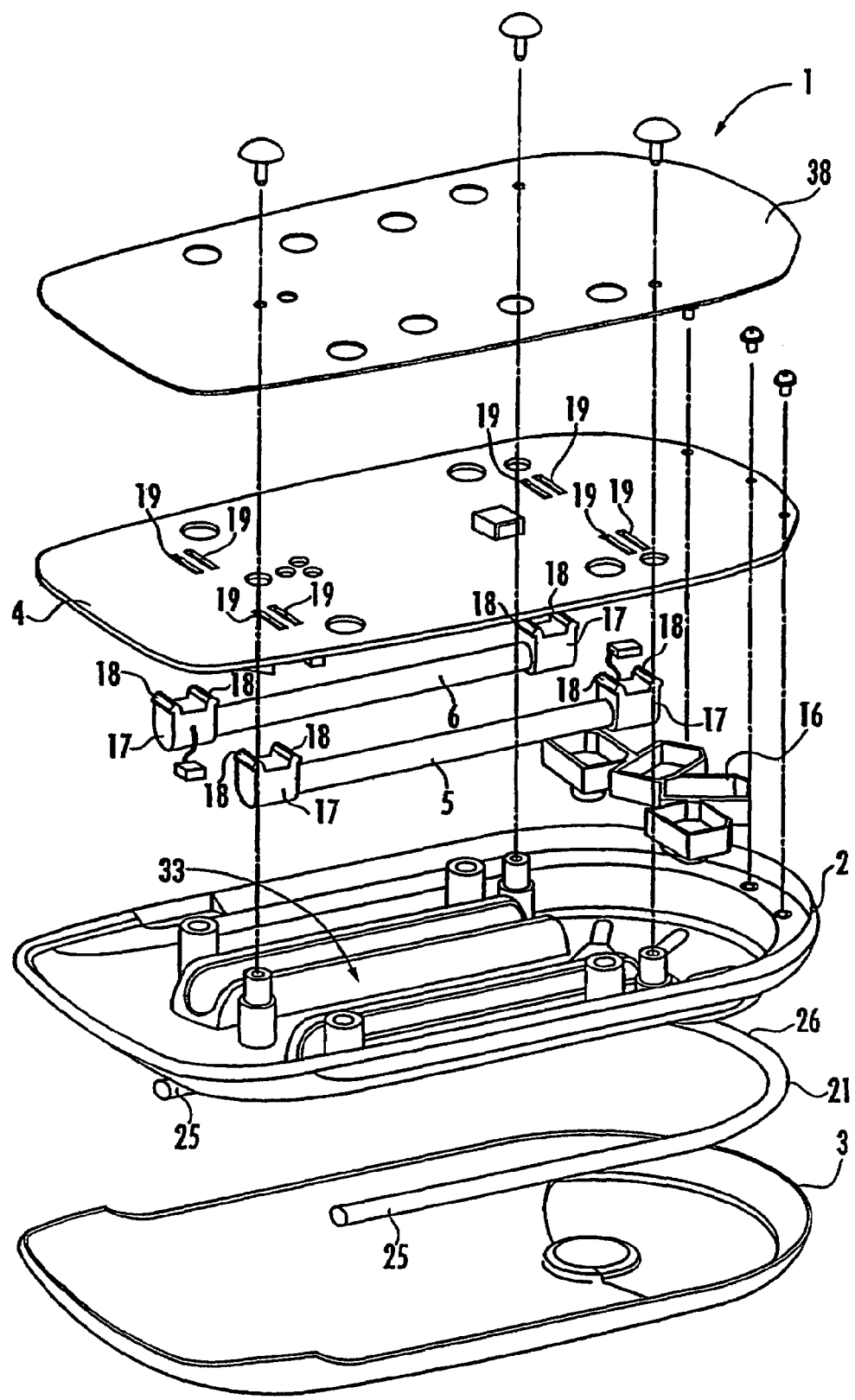
FIG. 10 is an exploded perspective view of the illuminator according to the embodiment.
Figure 11:
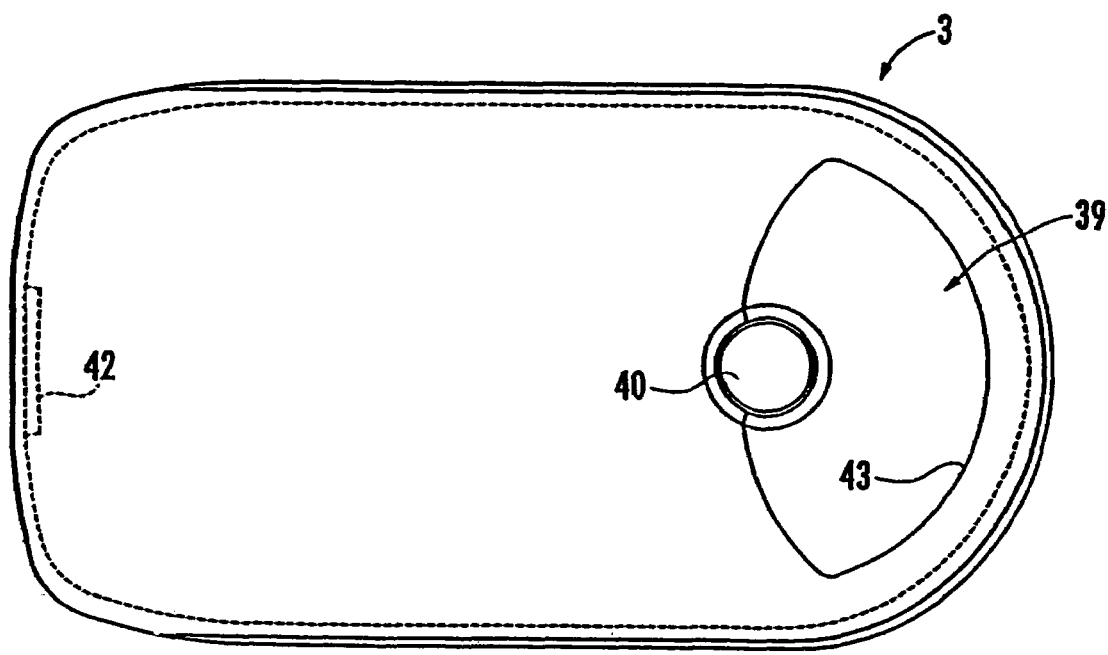
FIG. 11 is a plan view of an optically transparent cover.
Figure 12:
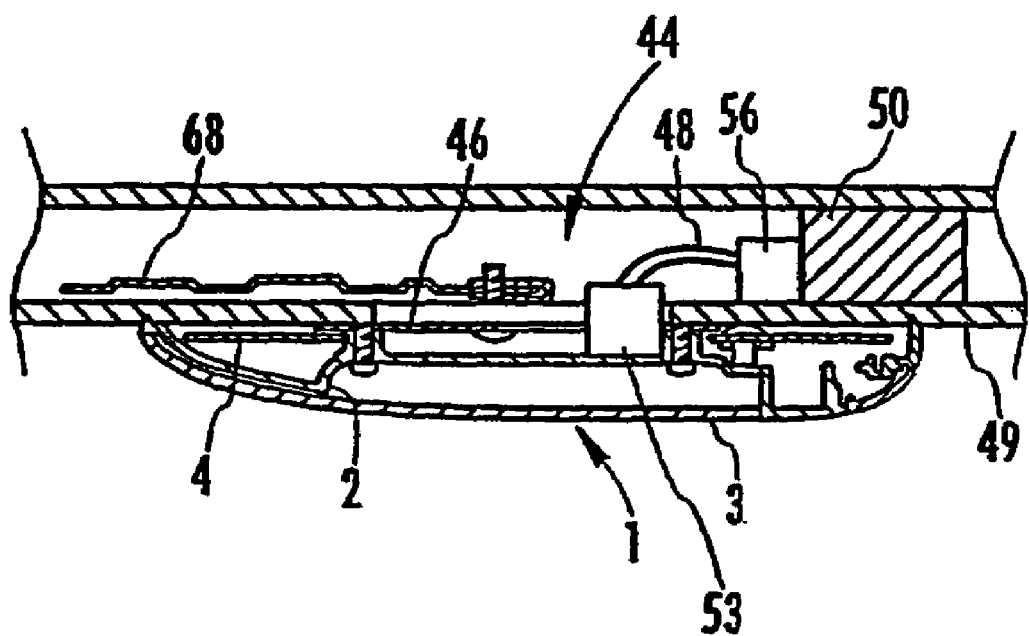
FIG. 12 is a cross sectional view of the illuminator attached to a ceiling of an automobile.
Figure 13:
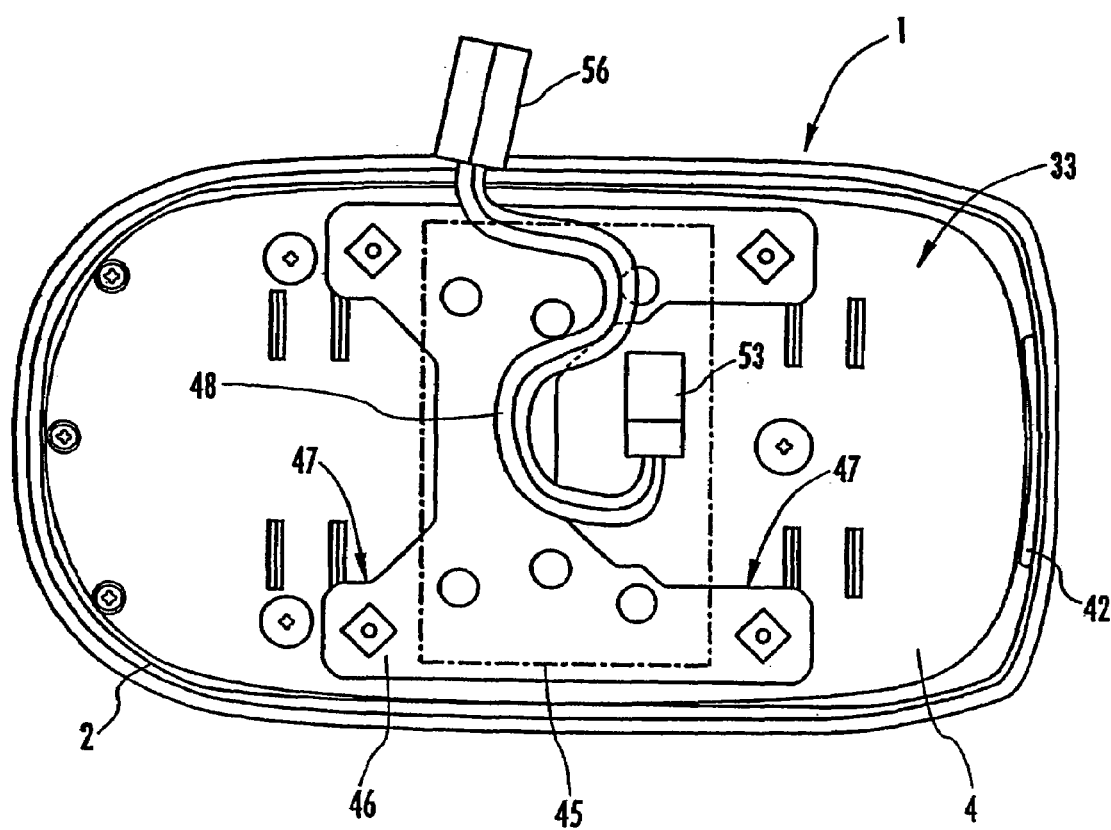
FIG. 13 shows an attaching member.
Figure 14:
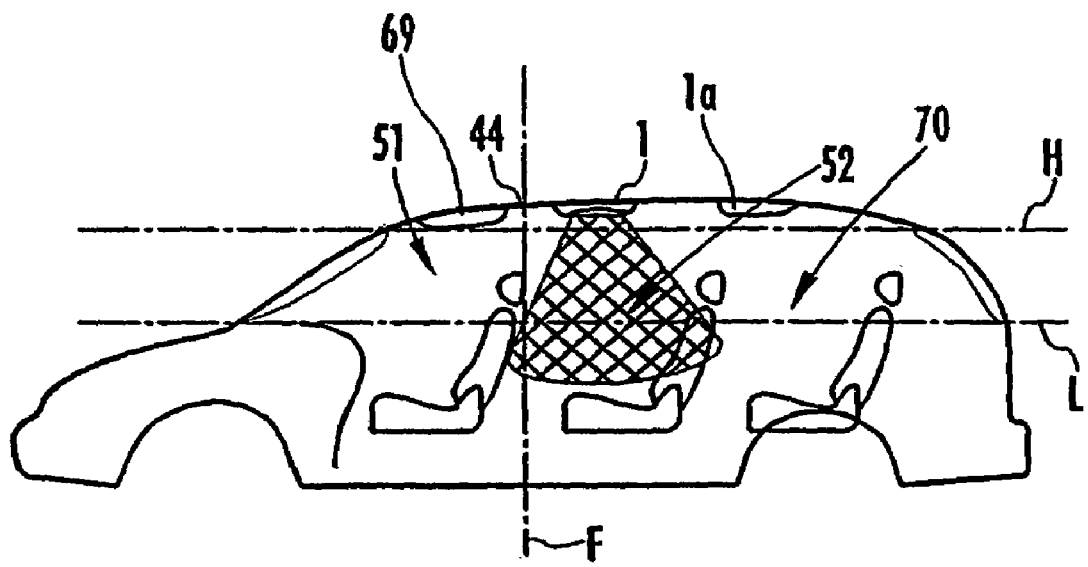
FIG. 14 is a cross sectional view of an automobile for illustrating the interior thereof.
Figure 15:
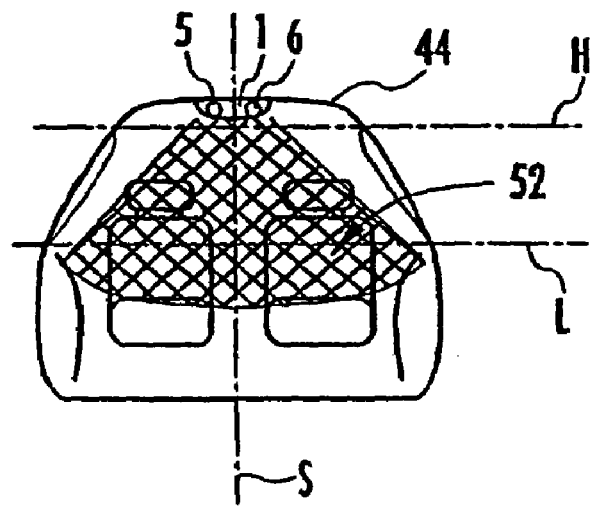
FIG. 15 is another cross sectional view of the automobile for illustrating the interior thereof.
Figure 16:
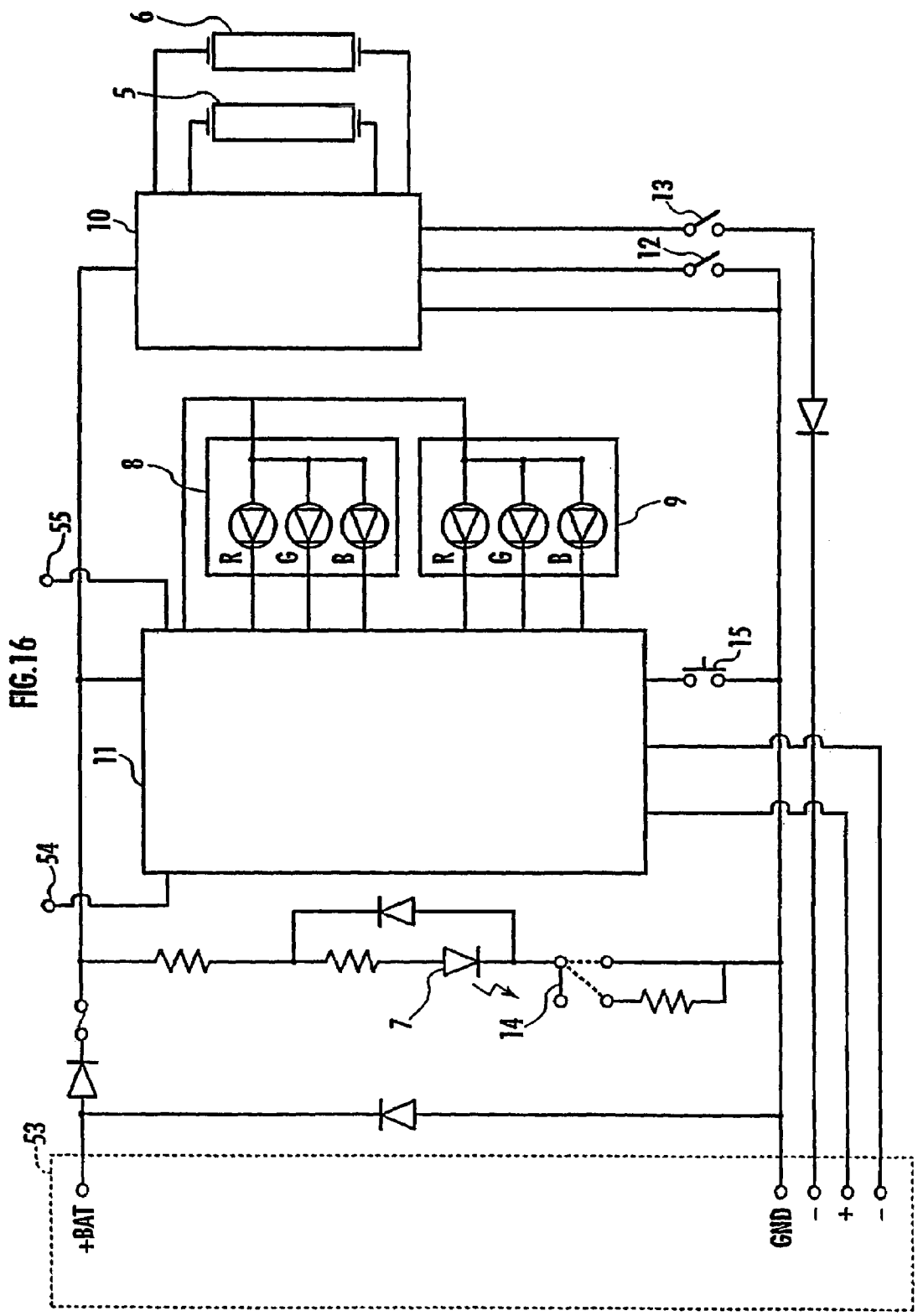
FIG. 16 is a block diagram showing an electric circuit according to the embodiment.

An embodiment of the present invention will be described with reference to the drawings. FIG. 1 is a plan view of an illuminator according to this embodiment, FIG. 2 is a cross sectional view of the illuminator taken along the line II-II in FIG. 1, FIG. 3 is a cross sectional view of the illuminator taken along the line III-III in FIG. 1, FIG. 4 is a plan view of a circuit board, FIG. 5 is a cross sectional view of a part of the circuit board, FIG. 6 is a plan view of a housing, FIG. 7 is a cross sectional view of the housing taken along the line VII-VII in FIG. 6, FIG. 8 is a cross sectional view of the housing being formed taken along the line VIII-VIII in FIG. 6, FIG. 9 is a cross sectional view of the housing being formed taken along the line IX-IX in FIG. 6, FIG. 10 is an exploded perspective view of the illuminator according to this embodiment, FIG. 11 is a plan view of an optically transparent cover, FIG. 12 is a cross sectional view of the illuminator attached to the ceiling of an automobile, FIG. 13 shows an attaching member, FIG. 14 is a cross sectional view of an automobile for illustrating the interior thereof, FIG. 15 is another cross sectional view of the automobile for illustrating the interior thereof, and FIG. 16 is a block diagram showing an electric circuit according to this embodiment.

As shown in FIG. 1, viewed from the outside, an illuminator 1 according to this embodiment has a housing 2 and an optically transparent cover 3 on the housing 2. As described later, the housing 2 supports a light guide body 21 (for example, an optical fiber) and houses a circuit board 4 as shown in FIGS. 2 and 3.

First, the circuit board 4 in the housing 2 and components of the circuit board 4 will be described. The circuit board 4 includes a pair of cold cathode tubes 5 and 6, a spot light emitting element 7 and a pair of multicolor light emitting elements 8 and 9, which serve as light sources. In a space between the paired cold cathode tubes 5 and 6 on the circuit board 4, a cold cathode tube driving circuit 10, such as an inverter, for driving the cold cathode tubes 5 and 6 is provided. The cold cathode tubes 5, 6 each comprise: a glass tube containing adequate amounts of mercury and an inert gas (for example, argon, neon or a mixed gas) and having the inner wall coated with a phosphor; and electrodes provided at the ends of the glass tube or on the side wall of the glass tube along the half of its perimeter. When a high voltage is applied between the electrodes, electrons are emitted from the electrodes and collide with mercury molecules to produce ultraviolet rays, which, in turn, causes the phosphor to emit visible light. In the cold cathode tubes 5, 6, the half of the perimeter of the side wall of the glass tube on which the electrode is provided does not emit light, and the half of the perimeter of the side wall of the glass tube on which no electrode is provided emits relatively intense light. Therefore, the light from the cold cathode tubes 5, 6 has a relatively high directivity. In addition, the cold cathode tubes 5, 6 typically have a long life of 10 thousands hours or more, and the glass tube can have an extremely small diameter.

In addition, in a rearward space on the circuit board 4, there is provided a multicolor light emitting element control circuit 11 that controls light emission of the pair of multicolor light emitting elements 8 and 9. In a forward space on the circuit board 4, there are provided a plurality of (four, in this embodiment) manipulation switches 12, 13, 14 and 15. The manipulation switches 12, 13, 14 and 15 are each covered with a switch cover 16 made of rubber to prevent contact failure due to intrusion of dust or the like.

An electrode covering member 17 (or a terminal holding member) made of an elastic soft synthetic resin or the like (silicon rubber, in this embodiment) is attached to each of the longitudinal ends of each of the cold cathode tubes 5 and 6. As shown in the partial cross sectional view of FIG. 5, the electrode covering member 17 is removably attached to the circuit board 4 with a claw 18 extending from the bottom of the electrode covering member 17 being inserted to and engaged with an engaging hole 19 formed in the circuit board 4. Furthermore, as shown in FIG. 4, each cold cathode tube has an electric supply lead 20 extending from one of the electrode covering members 17, and the electric supply lead 20 is removably connected to the circuit board 4 with a connector 20a and electrically connected to the cold cathode tube driving circuit 10 via a wiring pattern of the circuit board 4. Thus, each cold cathode tube 5, 6 can be readily attached to the circuit board 4. In addition, since the electrode covering member 17 is made of a soft synthetic resin (silicon rubber) or the like, vibrations occurring when the automobile runs can be absorbed adequately.

The multicolor light emitting elements 8 and 9 are LEDs that can selectively emit light of plural colors under the control of the multicolor light emitting element control circuit 11 and each provided near either side edge of the circuit board 4. Each of the multicolor light emitting elements 8 and 9 is positioned so as to face one end of the light guide body 21 supported by the housing 2 as described later, and the light emitted from each of the multicolor light emitting elements 8 and 9 is incident on the end of the light guide body 21. While the LEDs capable of selectively emitting light of plural colors are used as the multicolor light emitting elements 8 and 9 in this embodiment, a set of LEDs that emit light of different colors may be used, for example (not shown).

As the spot light emitting element 7, an LED that emits light of a color close to the color of natural light is used. As shown in FIG. 4, the spot light emitting element 7 is provided in a space between the cold cathode tubes 5, 6 and the manipulation switches 12, 13, 14, 15 on the circuit board 4.

The areas in the surface of the circuit board 4 that face the light sources preferably have a highly bright color. In this embodiment, the areas have a white color. Thus, the light from each light source can be prevented from being absorbed by the circuit board 4 and can be utilized efficiently.

Now, the housing 2 will be described in detail. As shown in FIG. 6, the housing 2 is made of a synthetic resin and has a light guide body holding groove 22 for holding the light guide body 21 which extends along the circumference from one side to the other side via the forward edge. The light guide body holding groove 22 comprises a pair of straight holding sections 23 extending straight along either side edge of the housing 2 and an arc shaped holding section 24 that is curved along the forward edge of the housing 2. Once fitted into and held by the light guide body holding groove 22, as shown in FIG. 1, the light guide body 21 has a pair of straight sections 25 extending along the side edges of the housing 2 and a curved section 26 extending along the forward edge of the housing 2, and thus, has a substantially U shape.

As shown in FIGS. 6 and 7, at the rearward ends of the straight holding sections 23 of the light guide holding groove 22, there are provided insertion holes 27 for inserting the end portions of the light guide body 21 to the inside of the housing 2. As shown in FIG. 7, the housing 2 has a projection 22a formed on the inner surface near the insertion hole 27. The end portion of the light guide body 21 inserted through the insertion hole 27 is slightly bent by the projection 22a so as to precisely face the multicolor light emitting element 8 (9) on the circuit board 4. Besides, as shown in FIGS. 6 and 3, at the rearward end of the straight holding section 23, there is formed an engaging protrusion 28 that protrudes slightly into the groove and has a smooth ridge line (that is, extremely slightly not to cover the light guide body 21). The engaging protrusion 28 abuts against the light guide body 21 from the inner side thereof to prevent the light guide body 21 from dropping off. Furthermore, since the engaging protrusion 28 protrudes slightly and has a smooth ridge line, the engaging protrusion 28 can surely lock the light guide body 21 without inhibiting the diffusion of the light from the light guide body 21.

Furthermore, as shown in FIG. 2, in the light guide body holding groove 22, a relatively low engaging step section 29 (specifically, that is low enough to avoid covering the light guide body 21) is formed along the peripheral wall of the arc-shaped holding section 24. The engaging step section 29 abuts against the light guide body 21 from the inner side thereof to prevent the light guide body 21 from dropping off the arc-shaped holding section 24 of the light guide body holding groove 22. Furthermore, since the engaging step section 29 is a relatively low step, the engaging step section 29 can surely lock the light guide body 21 without inhibiting the diffusion of the light from the light guide body 21.

In addition, as shown in FIG. 6, a base end through-hole 30 that opens into the housing 2 is formed in the bottom of the light guide holding groove 22 at a position associated with the engaging protrusion 28 (that is, near the insertion hole 27). The base end through-hole 30 serves to maintain the ease of molding even if the engaging protrusion 28 is formed during shaping of the resin into the housing 2. That is, as shown in FIG. 8, the engaging protrusion 28 can be easily formed using only two split molds, that is, an upper mold 100 and a lower mold 101, and the upper mold 100 and the lower mold 101 can be easily separated from the engaging protrusion 28. Similarly, a curved through-hole 31 that opens into the housing 2 is formed in the bottom of the light guide holding groove 22 at a position associated with the engaging step section 29. The curved through-hole 31 serves to maintain the ease of molding even if the engaging step section 29 is formed during shaping of the resin into the housing 2. That is, as shown in FIG. 9, the engaging step section 29 can be easily formed using only two split molds, that is, an upper mold 100 and a lower mold 101, and the upper mold 100 and the lower mold 101 can be easily separated from the engaging step section 29.

In addition, the light guide body holding groove 22 has an abutting bottom section 32 between the base end through-hole 30 and the curved through-hole 31 (which is the straight holding section 23 excluding the base end through-hole 30). Forming the base end through-holes 30 and the curved through-hole 31 can reduce the weight of the housing 2, and providing the abutting bottom section 32 allows the housing 2 to have an adequate strength. In addition, the base end through-holes 30, the curved through-hole 31 and the abutting bottom section 32 allows the light launched from the multicolor light emitting elements 8 and 9 into the light guide body 21 to be substantially uniformly diffused over the length of the light guide body 21. That is, when the light from the multicolor light emitting elements 8 and 9 is incident on the end faces of the light guide body 21 held in the shape of the letter U, the quantity of diffused light is large near the insertion holes 27, which are adjacent to the incident positions of the light from the multicolor light emitting elements 8 and 9, and in the curved section 26 of the light guide body 21, which provides increased internal reflection, and the quantity of diffused light is small in the straight sections 25 distant from the insertion holes 27. According to this embodiment, since the base end through-holes 30 and the curved through-hole 31 are provided at the positions in the light guide body 21 where the quantity of diffused light is large, an excessive quantity of diffused light can be controlled by directing some of the diffused light in the light guide body 21 to the inside of the housing 2. On the other hand, since the abutting bottom sections 32 are provided at the positions in the light guide body 21 where the quantity of diffused light is small, the diffused light can be reflected in the light guide body 21, thereby increasing the light diffused to the outside. In this way, the quantity of light can be made substantially uniform over the light guide body 21.

In addition, as shown in FIG. 10, a circuit board housing section 33 for housing the circuit board 4 is provided in the housing 2. As shown in FIG. 2, the circuit board 4 housed in the circuit board housing section 33 is screwed to the housing 2 at a position close to the rear of the housing 2 and at positions at the outer ends of the arc-shaped holding section 24 of the light guide body holding groove 22. In the housing 2, the outer ends of the arc-shaped holding section 24 are relatively susceptible to bending, because the curved through-hole 31 is formed in the arc-shaped holding section 24 of the light guide holding groove 22. However, the circuit board 4 screwed to the housing 2 serves as a reinforcing member, and thus, the rigidity of the housing 2 can be improved.

In addition, as shown in FIG. 6, the housing 2 has a pair of slit-like first light source apertures 34 that allow the cold cathode tubes 5, 6 to be exposed to the outside of the housing 2 when the circuit board 4 is attached to the circuit board housing section 33, a second light source aperture 35 that allows the spot light emitting element 7 to be exposed to the outside of the housing 2 when the circuit board 4 is attached to the circuit board housing section 33, and switch apertures 36 that allows the manipulation switches 12, 13, 14 and 15 to be exposed to the outside through the switch covers 16 when the circuit board 4 is attached to the circuit board housing section 33. Curved partition walls 37 are provided around the second light source aperture 35 and the first light source apertures 34. As shown in FIG. 3, an inner partition wall 37a, which constitutes an inner wall of the light guide body holding groove 22 between each cold cathode tube 5 (6) and the light guide body 21, has such a height that the tip end of the inner partition wall 37a does not abut against the optically transparent cover 3.

In addition, as shown in FIGS. 2 and 3, the outer edge of the housing 2 that abuts against the ceiling of the automobile is chamfered inward and is relatively sharp. In general, the ceiling of the automobile is covered with an interior covering material which is relatively soft. When the housing 2 is attached to the ceiling, the relatively sharp outer edge of the housing 2 digs into the interior covering material, so that the light can be surely prevented from leaking from the housing 2. Here, on the back side of the circuit board 4 that faces the ceiling of the automobile when the circuit board 4 is attached to the ceiling, the circuit board 4 preferably has a back cover plate 38 that prevents the elements and the wires on the circuit board 4 from coming into contact with the ceiling, as shown in FIG. 10.

Now, the optically transparent cover 3 will be described in detail. As shown in FIG. 11, the optically transparent cover 3 has a switch exposing section 39 for exposing the part of the housing 2 in which the switch apertures 36 are formed, and the cold cathode tubes 5, 6, the spot light emitting element 7 and the light guide body 21 that are exposed to the outside of the housing 2 are covered with the remaining part of the optically transparent cover 3. The optically transparent cover 3 is made of a transparent synthetic resin and has a spot lens section 40 at a position over the spot light emitting element 7. In addition, a translucent diffuse-transmission sheet (not shown) for diffusing light that does not inhibit light transmission is applied to the area other than the spot lens section 40. The diffuse-transmission sheet can expand the outline of the light source of the cold cathode tubes 5, 6 themselves without broadening the relatively high directivity of light emitted by the cold cathode tubes, prevent the cold cathode tubes 5 and 6 from being directly viewed and the light from being excessively bright and obscure the outline of the light guide body 21 to make the light soft. The optically transparent cover 3 can be provided with the function to diffuse light by applying the diffuse-transmission sheet to the optically transparent cover 3 or by processing the surface of the optically transparent cover 3 to have fine asperities.

The optically transparent cover 3 with the diffuse-transmission sheet in this embodiment or the optically transparent cover 3 with fine asperities on the surface constitutes a diffuse transmissive member according to the present invention.

Furthermore, as shown in FIG. 2, the optically transparent cover 3 has an engaging protrusion 42 to be engaged with an engaging hole 41 formed in the rear edge of the housing 2 and a fitting section 43 to be fitted onto the inner wall of the light guide body holding groove 22 of the housing 2 and, therefore, is fixedly mounted onto the housing 2. Since the housing 2 is reinforced with the optically transparent cover 3, the rigidity of the housing 2 is further improved.

The illuminator 1 according to this embodiment thus configured is positioned in such a manner that the longitudinal direction of the cold cathode tubes 5, 6 are aligned with the longitudinal direction of the automobile and the front ends of the manipulation switches 12, 13, 14 and 15 are directed to the rear of the automobile. Here, the midpoint between the cold cathode tubes 5 and 6 is positioned on a longitudinal center line of the automobile (specifically, the line II-II in FIG. 1 corresponds to the center line of the automobile). Alternatively, the illuminator 1 may be positioned with the front ends of the manipulation switches 12, 13, 14 and 15 being directed to the front of the automobile. That is, any orientation of the illuminator 1 can be appropriately chosen depending on the type or shape of the automobile (for example, the dimensions of the interior), as far as the longitudinal direction of the cold cathode tubes 5 and 6 corresponds to the longitudinal direction of the automobile, and the midpoint between the cold cathode tubes 5 and 6 is positioned on a longitudinal center line of the automobile.

To attach the illuminator 1 according to this embodiment to the ceiling of the automobile, as shown in FIG. 12, an attaching member 46 is first screwed to a ceiling 44 so as to cover an opening 45 in the ceiling 44 (shown by the alternate long and short dash line in FIG. 13). Then, the circuit board 4 with the housing 2 is attached to the attaching member 46. Reference numeral 68 in FIG. 12 denotes a connecting member provided in the automobile. As shown in FIG. 13, the attaching member 46 is a metal plate having a pair of notches 47 and is substantially in the shape of the letter H. A distribution line 48, such as a signal line or electric supply line, extending to the back of the circuit board 4 can be introduced into the opening 45 in the ceiling 44 via the notches 47. The distribution line 48 is removably connected to the circuit board 4 with a connector 53 on the backside of the board. The distribution line 48 is connected to a connector 56 branched from the wiring of the automobile and serves to supply electricity to the illuminator and transmit a door-open/close signal to the illuminator. If the switches of the illuminator 1 are hard to manipulate due to an interior covering material 49 on the ceiling of the automobile being deformed, as shown in FIG. 12, a presser member 50 may be inserted inside the interior covering material 49.

As shown in FIGS. 14 and 15, the illuminator 1 according to the present invention is positioned on a longitudinal center line of the automobile, behind a driver's seat 51 (that is, behind the driver's seat moved to the rearmost position shown by the alternate long and short dash line F in FIG. 14) and above a backseat 52. A component located above the driver's seat 51 in FIG. 14 and denoted by reference numeral 69 is an illuminator for the front seats (that is, the driver's seat and the passenger seat) that can illuminate the left side and the right side separately. With the illuminator 1 mounted above the backseat 52, as shown in FIG. 15, the cold cathode tube 5 is located on the right side of the longitudinal center line of the automobile (the position indicated by the alternate long and short dash line S in FIG. 15), and the cold cathode tube 6 is located on the left side of the longitudinal center line of the automobile (the position indicated by the alternate long and short dash line S in FIG. 15). Since the cold cathode tubes 5 and 6 have a relatively high directivity, as shown in FIG. 14, by using the cold cathode tubes 5 and 6 to illuminate the backseat 52, the illuminator 1 according to this embodiment can prevent the driver's seat 51 from being illuminated and can achieve a sufficient quantity of light with a relatively low electric power on the side of the backseat 52. In addition, as shown in FIG. 15, the cold cathode tubes 5 and 6 each have a primary optical axis (that is, an optical axis at the center of the illumination range of the cold cathode tube 5 (6)) inclined at a predetermined angle in the lateral direction of the automobile so that the outer perimeter of the illumination range is lower than the lower edge of a window of the automobile (shown by the alternate long and short dash line L in the drawing). The inclination angle of each cold cathode tube 5 (6) is determined based on the distance from the cold cathode tube 5 (6) to the line connecting the lower edges of the left and right windows. Since the primary optical axes of the cold cathode tubes 5 and 6 are inclined oppositely in the lateral direction of the automobile to set the illumination ranges lower than the lower edges of the windows, the light can be prevented from being reflected from the windows to an occupant, and the cold cathode tubes 5 and 6 can be prevented from being reflected in the windows. According to this embodiment, in order for the illuminator attached to various automobiles to be adequately effective, as shown in FIG. 3, the primary optical axes are inclined oppositely: a primary optical axis a of the cold cathode tube 5 is inclined leftward (rightward in the figure, because FIG. 3 is a upside-down diagram) by an angle $\theta$ of 15° from a downward vertical line (shown as a upward vertical line y in FIG. 3, because FIG. 3 is a upside-down diagram); and a primary optical axis a of the cold cathode tube 6 is inclined rightward (leftward in the figure, because FIG. 3 is a upside-down diagram) by an angle $\theta$ of 15° from a downward vertical line (shown as a upward vertical line y in FIG. 3, because FIG. 3 is a upside-down diagram). According to various tests on a plurality of types of automobiles performed by the inventor, as for the illuminator 1 according to this embodiment, when the primary optical axis a of the cold cathode tube 5 is inclined leftward by an angle ($\theta$ in FIG. 3) of 10° to 20° from the downward vertical line, and the primary optical axis a of the cold cathode tube 6 is inclined rightward by an angle ($\theta$ in FIG. 3) of 10° to 20° from the downward vertical line, the backseat 52 can be adequately illuminated while preventing light reflection in the windows.

Furthermore, since the illuminator 1 according to this embodiment uses the cold cathode tubes 5 and 6, it can have smaller size than conventional illuminators using a fluorescent lamp and have a relatively small thickness. Since the illuminator 1 can have a relatively small thickness, the illuminator 1 can be accommodated under the slightly curved ceiling 44 in a state where the illuminator 1 is recessed above the line connecting the upper edges of the windows, although not shown in detail. Thus, the illuminator 1 can be prevented from being viewed by an occupant of another automobile.

Furthermore, the cold cathode tubes 5 and 6 turn on quickly when power is turned on, compared with conventional fluorescent lamps. For example, the cold cathode tubes can be associated with opening and closing of the doors to illuminate the interior quickly. In addition, the cold cathode tubes 5 and 6 advantageously have a longer life than conventional fluorescent lamps and require no maintenance, such as replacement.

Since the illuminator 1 according to this embodiment has the light guide body 21 as shown in FIG. 1, multicolor illumination can be provided around the illuminator 1, thereby producing a desired atmosphere by the illumination color in the automobile. Since the light from the multicolor light emitting elements 8 and 9 is incident on the both ends of the light guide body 21, a sufficient quantity of light can be provided over the length of the light guide body 21. In addition, as described above, since the light guide body holding groove 22 of the housing 2 that holds the light guide body 21 has the base end through-holes 30, the curved through-hole 31 and the abutting bottom sections 32, which make the quantity of light uniform over the light guide body 21, it is possible to present a fine spectacle to the occupant. In addition, for example, if the multicolor light emitting elements 8 and 9 emits light of different colors, the light guide body 21 can emit light of plural colors at the same time, and thus, an atmosphere the occupant desires can be readily produced. Furthermore, as shown in FIG. 2, through the optically transparent cover 3, the light in the housing 2 can be introduced from the engaging protrusion 42 engaged with the engaging hole 41 formed in the rear edge of the housing 2. Thus, it is possible to provide a beautiful illumination at the rear end of the housing 2.

Now, a method of manipulating the illuminator 1 according to this embodiment and an operation thereof will be described specifically. Referring to FIG. 16, the manipulation switch 12 is to turn on and off the cold cathode tubes 5 and 6. The manipulation switch 13 is to choose whether or not to associate the lighting of the cold cathode tubes 5 and 6 with the opening of the doors. The manipulation switch 14 is to select the quantity of light of the spot light emitting element 7 and to turn on and off the spot light emitting element 7. The manipulation switch 15 is to select colors of the multicolor light emitting elements 8 and 9 and to turn on and off the multicolor light emitting elements 8 and 9 via the multicolor light emitting element control circuit 11. Specifically, the multicolor light emitting elements 8 and 9 are switched among blue, light blue, green, yellow green, yellow, orange, magenta, automatic demonstration and OFF depending on the number of manipulations (pressings or the like) of the manipulation switch 15. For example, the automatic demonstration is to continuously change color at predetermined intervals. The multicolor light emitting element control circuit 11 can controls the multicolor light emitting elements 8 and 9 in a predetermined manner by detecting simultaneous manipulations of the manipulation switches 12 and 15. Specifically, for example, when no one is in the automobile, the multicolor light emitting elements 8 and 9 are controlled to turn on and off with a red color at predetermined intervals, in order for the automobile not to be stolen. As shown in FIG. 16, the connector 53 is connected to the wiring of the automobile for electric supply and input of a door-open/close signal.

In addition, the multicolor light emitting element control circuit 11 has an input section 54 for receiving a control signal from the outside and an output section 55 for outputting a signal indicating an operational status of the illuminator 1 to the outside. Incoming signals through the input section 54 primarily include a brake manipulation signal, a reverse manipulation signal and a direction indicator manipulation signal. If a brake manipulation signal is received at the input section 54, the multicolor light emitting control circuit 11 makes the multicolor light emitting elements 8 and 9 emit light of a predetermined color, such as red, and if a reverse manipulation signal is received, the multicolor light emitting control circuit 11 makes the multicolor light emitting elements 8 and 9 emit light of another predetermined color, such as white. Furthermore, if a direction indicator manipulation signal is received at the input section 54, the multicolor light emitting element control circuit 11 makes one of the multicolor light emitting elements 8 and 9 which is located on the side corresponding to the direction of the turning automobile blink with a predetermined color, such as orange. Thus, an occupant on the backseat can readily recognize the behavior of the automobile by checking the light emission of the light guide body 21 of the illuminator 1.

Other control signals may be received at the input section 54, depending on the information equipment mounted on the automobile. For example, various kinds of information about velocity, engine speed, temperature, time, door lock status (open or closed) may be input. For example, if a signal concerning temperature is input at the input section 54, the multicolor light emitting elements 8 and 9 can be made to emit light of a warm color when the temperature is low and to emit light of a cold color when the temperature is high. Alternatively, if an on-vehicle clock has a calendar function, a signal concerning the month and date can be input at the input section 54, and the colors of the multicolor light emitting elements 8 and 9 can be adjusted according to the season. Furthermore, a signal concerning the month and date can be input at the input section 54, and the multicolor light emitting elements 8 and 9 can be made to emit light of a predetermined color on the date of birth of the user of the automobile, for example.

Furthermore, a sound signal from an on-vehicle acoustic device can be input at the input section 54 as a control signal. In this case, the color or the quantity of light of the multicolor light emitting elements 8 and 9 can be changed depending on the pitch or intensity of the sound from the on-vehicle acoustic device.

Furthermore, although not shown, the illuminator 1 according to this embodiment may have voice synthesis means and provide voice information according to the control signal received at the input section 54. In this case, there can be provided not only sound information associated with the various information described above but also sound information about an operational status of the illuminator 1 (for example, what color is chosen for the multicolor light emitting element 8, 9), a manipulation procedure of the manipulation switches 12, 13, 14 and 15 or the like.

In this embodiment, a pair of cold cathode tubes 5 and 6 are used, and the primary optical axes of the cold cathode tubes 5 and 6 are inclined oppositely in the lateral direction of the automobile, thereby setting the illumination ranges thereof lower than the lower edges of the window glasses. However, although not shown, a single cold cathode tube may suffice, if the cold cathode tube has a sufficient quantity of light and has such a directivity that the illumination range is lower than the lower edges of the window glasses located behind the driver's seat.

Furthermore, if the interior space of the automobile is relatively large, and the automobile has a third seat 70 as shown in FIG. 14, an illuminator 1a configured the same as the illuminator 1 according to this embodiment described above may be attached above the third seat. In this case, for example, the illuminator 1 located forward in the interior of the automobile may be attached with the front ends of the manipulation switches 12, 13, 14 and 15 being directed to the front of the automobile, and the illuminator 1a located rearward in the interior of the automobile may be attached with the front ends of the manipulation switches 12, 13, 14 and 15 being directed to the rear of the automobile.

What is claimed is:

1. An interior illuminator for an automobile that is attached to a ceiling of the automobile, comprising:
    a cold cathode tube having a predetermined length;
    a cold cathode tube driving circuit for driving the cold cathode tube;
    a manipulation switch for turning on and off the cold cathode tube; and
    a housing that houses the cold cathode tube driving circuit and holds the cold cathode tube and the manipulation switch,
    wherein the housing is attached in a position on a longitudinal center line of the automobile and behind the driver's seat, and
    the cold cathode tube has a glass tube comprising a first portion of a circumferential perimeter along an entire length of the glass tubes which emits light and a second portion of the circumferential perimeter along an entire length of the glass tubes which does not emit light,
    wherein light emitted from said first portion of the perimeter of the glass tube emitting light is substantially directed to a lower illumination range than the lower edge of a window glass located behind the driver's seat.

2. The interior illuminator for an automobile according to claim 1, wherein said housing holds a second cold cathode tube so as to form a pair of cold cathode tubes arranged in parallel and attached to the ceiling of the automobile in such a manner that the cold cathode tubes are placed on the opposite sides of the longitudinal center line of the automobile.

3. The interior illuminator for an automobile according to claim 2, wherein said paired cold cathode tubes are provided with primary optical axes thereof being inclined at a predetermined angle oppositely in the lateral direction of the automobile.

4. The interior illuminator for an automobile according to claim 3, wherein the primary optical axes of said paired cold cathode tubes are inclined oppositely at an angle of 10° to 20° with respect to a vertical downward direction.

5. The interior illuminator for an automobile according to claim 1, wherein said cold cathode tube is supported on a circuit board via a pair of terminal holding sections that cover electrode terminals of the cold cathode tube provided at the longitudinal ends thereof, the circuit board comprising said cold cathode tube driving circuit, and said terminal holding sections are made of an elastic soft material.

6. The interior illuminator for an automobile according to claim 5, wherein a surface of said circuit board on which said cold cathode tube is mounted has a highly bright color.

7. The interior illuminator for an automobile according to claim 1, wherein said housing has a diffuse-transmission member that at least covers said cold cathode tube and transmits and diffuses the light from the cold cathode tube.

8. The interior illuminator for an automobile according to claim 1, wherein the ceiling of said automobile has a curve in profile, and said cold cathode tube is located above a plane connecting upper edges of window glasses and accommodated in the curve of the ceiling.

9. The interior illuminator for an automobile according to claim 1, wherein said cold cathode tube has an electrode provided on a side wall of the glass tube, wherein said first portion of the perimeter of the glass tube emitting light is the perimeter of the side wall of the glass tube on which no electrode is provided.

10. An interior illuminator for an automobile that is attached to a ceiling of the automobile, comprising:
    a pair of cold cathode tubes having a predetermined length;
    a cold cathode tube driving circuit for driving the cold cathode tubes;
    a manipulation switch for turning on and off the cold cathode tubes; and
    a housing that houses the cold cathode tube driving circuit and holds the cold cathode tubes and the manipulation switch,
    wherein the housing is attached in a position on a longitudinal center line of the automobile and behind the driver's seat, and
    the cold cathode tubes have glass tubes comprising a first portion of a circumferential perimeter along an entire length of the glass tubes which emits light and a second portion of the circumferential perimeter along an entire length of the glass tubes which does not emit light,
    wherein light emitted from said first portion of the perimeter of the glass tubes emitting light is substantially directed to a lower illumination range than the lower edge of a window glass located behind the driver's seat,
    wherein said cold cathode tubes are arranged in parallel and are attached to the ceiling of the automobile in such a manner that the cold cathode tubes are placed on the opposite sides of the longitudinal center line of the automobile, and
    wherein said pair cathode tubes are provided with primary optical axes thereof being inclined at a predetermined angle oppositely in the lateral direction of the automobile.

11. The interior illuminator for an automobile according to claim 10, wherein said paired cold cathode tubes have an electrode provided on a side wall of the glass tubes, wherein said first portion of the perimeter of the glass tubes emitting light is the perimeter of the side wall of the glass tubes on which no electrode is provided.

* * * * *